United States Patent [19]

Tanaka et al.

[11] Patent Number: 4,982,358

[45] Date of Patent: Jan. 1, 1991

[54] HIGH SPEED PROGRAMMABLE CONTROLLER FOR EXECUTING AN INSTRUCTION FORMED BY A LADDER

[75] Inventors: Kunio Tanaka, Akishima; Nobuyuki Kiya; Kimio Maeda, both of Hachioji; Yoshiharu Saiki, Minamitsuru, all of Japan

[73] Assignee: Fanuc Ltd., Minamitsuru, Japan

[21] Appl. No.: 274,150

[22] PCT Filed: Apr. 27, 1988

[86] PCT No.: PCT/JP88/00419

§ 371 Date: Nov. 9, 1988

§ 102(e) Date: Nov. 9, 1988

[87] PCT Pub. No.: WO88/08558

PCT Pub. Date: Nov. 3, 1988

[30] Foreign Application Priority Data

Apr. 30, 1987 [JP] Japan .................................. 63-107261

[51] Int. Cl.$^5$ .......................... G06F 15/46; G05B 11/01
[52] U.S. Cl. .................................. 364/900; 364/926.9; 364/949; 364/147
[58] Field of Search ...................... 364/200, 900, 147

[56] References Cited

U.S. PATENT DOCUMENTS

| 4,038,533 | 7/1977 | Dummermuth et al. | 364/900 |
| 4,450,525 | 5/1984 | Demuth et al. | 364/200 |
| 4,488,258 | 12/1984 | Struger et al. | 364/900 |
| 4,553,224 | 11/1985 | Struger et al. | 364/900 |
| 4,688,193 | 8/1987 | Yamaoka et al. | 364/900 |
| 4,722,043 | 1/1988 | Nagamine et al. | 364/147 |

FOREIGN PATENT DOCUMENTS 0180647 5/1986 European Pat. Off. .

OTHER PUBLICATIONS

IEEE Conference Record of 1987 Thirty-Ninth Annual Conference of Electrical Engineering Problems in Rubber and Plastic Industries, Apr. 6, 1987, Akron, Ohio, "Trends in Program Development Software for Programmable Control Systems", by James Shanley, pp. 14–19.

Primary Examiner—Raulfe B. Zache
Attorney, Agent, or Firm—Staas & Halsey

[57] ABSTRACT

A programmable controller according to the present invention has memory means (P) for registering any functional instruction. On the basis of a functional instruction stored in the memory means, an individual functional instruction (Func) is repeatedly output to a machine tool. When the format of a functional instruction changes due to a difference in input conditions, input condition (B, C) data are created as a ladder and, by executing a single fixed input condition (A), the lead address of an area storing the parameter of the individual functional instruction is called and output, whereby a functional instruction of a unified format is executed.

2 Claims, 1 Drawing Sheet

HIGH SPEED PROGRAMMABLE CONTROLLER FOR EXECUTING AN INSTRUCTION FORMED BY A LADDER

BACKGROUND OF THE INVENTION

1. Field of the Invention

This invention relates to a programmable controller capable of executing a functional instruction formed by a ladder.

2. Description of the Related Art

A programmable controller (hereinafter referred to as a "PC") implements sequence control of a numerical control NC machine tool by means of software. The PC is adapted so that a sequence expressed by a ladder diagram is written in a program stored in memory means such as a ROM, and the program is called whenever needed in order to control a machine tool. Control instructions forming each step of sequence control include a basic instruction and a functional instruction. The former is an instruction implementing a one-bit logical operation such as AND or OR, and the latter is an instruction prepared in order to instruct a complicated function peculiar to a machine.

More specifically, since forming arithmetic functions necessary for various kinds of control using one-bit basic instructions requires too much actual labor, generally a repeatedly used control function is registered beforehand as a functional instruction in a subroutine and is called from a main program.

Recently, the greater diversification and sophistication of objects subjected to control has been accompanied by a need to execute various subroutines besides the functional instructions registered by ladder language. In such cases, there is a tendency on the user side to require higher speed sequence control. However, in the preparation of such a prior-art ladder diagram, programming must be performed using basic instructions and already registered functional instructions when a subroutine other than a registered functional instruction is executed. Consequently, there is an increase in the number of steps. Accordingly, in cases where an individual functional instruction corresponding to a machine tool is used repeatedly in preparing a ladder, there is a need for a system in which any desired functional instruction can be created on the user side.

SUMMARY OF THE INVENTION

The present invention has been devised in order to solve the foregoing problem and its object is to provide a programmable controller capable of interfacing a ladder and an individual functional instruction.

According to the present invention, there is provided a programmable controller in which a functional instruction is formed and executed by a ladder. Memory means are included for storing a plurality of functional instruction subroutines. Also included are setting means for setting input conditions, which correspond to various types of functional instruction subroutines, in parameter areas, and input means for inputting any functional instruction which has a leading address of the input condition in a parameter area.

Accordingly, with the programmable controller of the present invention, programming is facilitated and the number of ladder steps is reduced to make high-speed control possible.

DESCRIPTION OF THE PREFERRED EMBODIMENTS

An embodiment of the invention will now be described in detail with reference to the drawings.

Figure 1A:
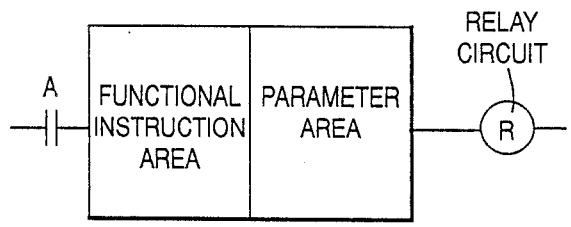
FIG. 1a and 1b block diagram of an embodiment according to the present invention.
Figure 1B:
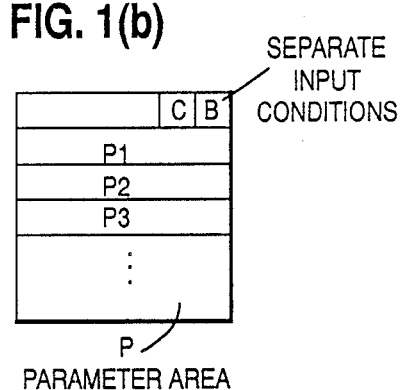

FIG. 1 is a view illustrating the format of a functional instruction Func stipulated by one input condition A, in which (a) is an equivalent relay circuit diagram and (b) is a diagram of a parameter area. The parameter area P has an area which stores separate input conditions such as B and C, and an area for storing parameters P1, P2, P3..., which stipulate input/output data. More specifically, even if an input condition to be prepared in a ladder changes with every functional instruction, a separate input instruction can be set in a parameter area by suitably applying a modification. This makes it possible to create any functional instruction.

Figure 2:
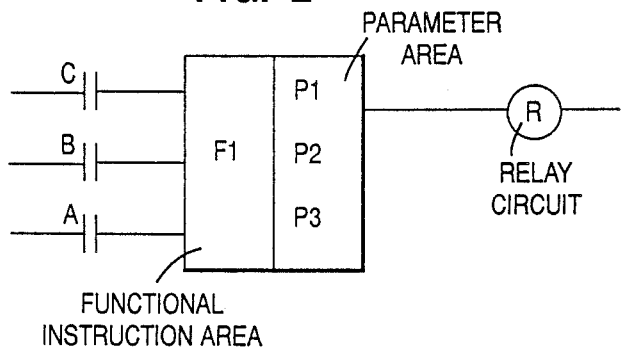
FIG. 2 is a diagram of a functional instruction format.

FIG. 2 is a diagram of the format of an equivalent relay circuit for implementing a functional instruction F1 stipulated by three input conditions A, B and C. Conventionally, when this functional instruction has not been registered as a subprogram, the functional instruction F1 must be formed as a combination of basic instructions. However, with the format of the equivalent relay circuit shown in FIG. 1, a functional instruction (any functional instruction) is registered in which a change in an input condition can be set in a parameter area. Therefore, the input condition can be registered even for a functional instruction having the format of FIG. 2 or a functional instruction having a different input format. That is, a ladder is set in the parameter area and the user is capable of individually creating any functional instruction executed by the single fixed input condition A. In this sense, the format of the functional instruction shown in FIG. 1(a) is a model format of the present invention. Accordingly, if a functional instruction having the model format of FIG. 1 is registered in advance, the user will be capable of calling this instruction when appropriate, fixing the contents of the parameter and creating an individual functional instruction.

Figure 3A:
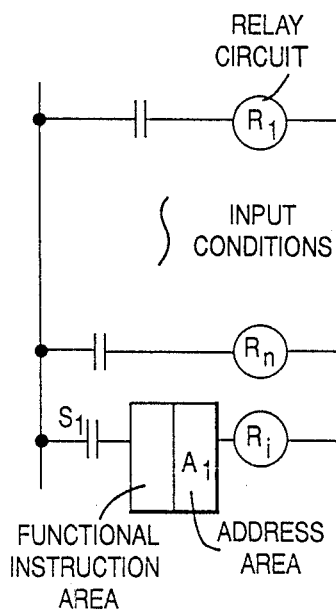
FIGS. 3(a), (b), and (c) are diagrams of a ladder, a program corresponding to the ladder, and a flowchart based on the program, respectively.
Figure 3B:
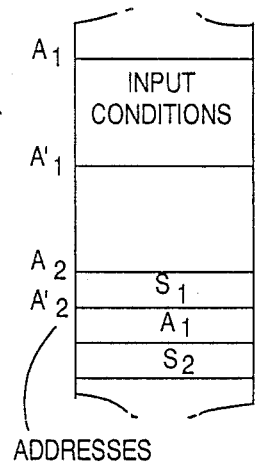
Figure 3C:
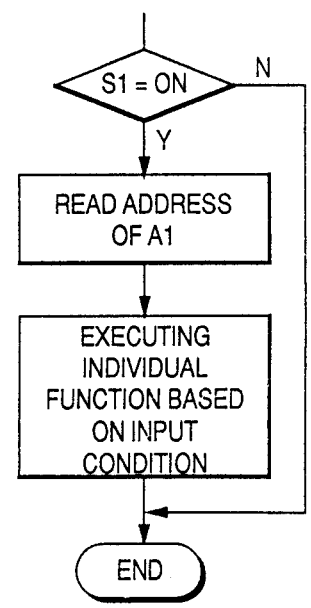

FIG. 3, which includes FIGS. 3(a)-3(c), is a ladder diagram in which FIG. 3(a) includes a basic model for creating any functional instruction using the above-described model format. The contents of a memory accessable from this ladder are shown in FIG. 3(b). FIG. 3(c) is a flowchart of ladder execution.

Ordinarily, the meaning of the control condition and the number thereof differ depending upon each functional instruction. However, in a functional instruction set by the model format of the kind shown in FIG. 1(a), the input condition data are set from address A1 to address A'. These data are set by the ladder in such a manner as to be called from an address A2 as a parameter of any functional instruction by a control condition S1. The lead address A1 of the area storing the contents of the parameter is set at the address A2'. Therefore, when the control condition S1 is satisfied, first reference is made to the parameter of the optional functional instruction, then operation is executed with the designated area serving as another input condition.

Thus, a plurality of functional instruction subroutines are stored and, in order to access them from a ladder, an input condition conforming to the type of functional instruction subroutine is constructed by a ladder. In other words, it will suffice to set any functional instruction of the model format and form an individual functional instruction having the lead address of the corresponding input condition in a parameter area.

Though an embodiment of the present invention has been described, the invention is not limited thereto and can be modified in a variety of ways without departing from the scope of the claims.

The programmable controller of the present invention makes it possible to fully exploit subroutine functions in a machine in which a ladder language and another language, such as PASCAL, coexist. By interfacing a ladder and a functional instruction, individual functional instructions other than already prepared functional instructions can be created with ease.

We claim:

1. A programmable controller in which a functional instruction is formed by a ladder and executed, comprising:

memory means, including functional instruction areas and parameter areas, for storing a ladder program including a plurality of functional instruction subroutines;

setting means, connected to said memory means, for setting input conditions, which conform to types of said functional instruction subroutines, in said parameter areas; and input means, connected to said memory means and said setting means, for inputting a functional instruction which has a leading address of said input condition in one of said parameter means.

2. A method for a programmable controller including a numerical controller, comprising the steps of:

(a) storing a plurality of functional instruction subroutines in a memory having a parameter area storing separate input conditions at various addresses and an area for stipulating input/output data;

(b) calling, by a control condition, the input conditions at selected addresses as a parameter of any functional instruction;

(c) creating a ladder by executing a single fixed input instruction when a format of the functional instruction changes due to a change in the input conditions;

(d) outputting a lead address in the parameter area of one of the functional instruction sub-routines; and (e) executing a unified format functional instruction which is output to a machine tool.

* * * * *